US012681787B2

(12) United States Patent
Hoermaier et al.

(10) Patent No.: US 12,681,787 B2
(45) Date of Patent: Jul. 14, 2026

(54) VOLATILE MEMORY SCHEMA FOR SAFE STATE CONFIGURATION

(71) Applicant: Infineon Technologies AG, Neubiberg (DE)

(72) Inventors: Klaus Hoermaier, Krumpendorf (AT); Martin Ringswirth, Kaltschach (AT); Gernot Unterweger, Latschach (AT)

(73) Assignee: Infineon Technologies AG, Neubiberg (DE)

( * ) Notice: Subject to any disclaimer, the term of this patent is extended or adjusted under 35 U.S.C. 154(b) by 71 days.

(21) Appl. No.: 18/777,058

(22) Filed: Jul. 18, 2024

(65) Prior Publication Data

US 2026/0023632 A1     Jan. 22, 2026

(51) Int. Cl.
G06F 11/00      (2006.01)
G06F 11/07      (2006.01)
H02J 105/30      (2026.01)

(52) U.S. Cl.
CPC ...... G06F 11/0739 (2013.01); G06F 11/0796 (2013.01); H02J 2105/30 (2026.01)

(58) Field of Classification Search
None
See application file for complete search history.

(56) References Cited

U.S. PATENT DOCUMENTS

| | | | | | |
|---|---|---|---|---|---|
| 4,398,233 | A | * | 8/1983 | Bala | .......................... G05B 9/02 |
| | | | | | 714/E11.017 |
| 5,790,873 | A | * | 8/1998 | Popper | .................... H02J 9/005 |
| | | | | | 713/340 |

| | | | | | |
|---|---|---|---|---|---|
| 9,690,642 | B2 | | 6/2017 | Anderson et al. | |
| 10,419,217 | B2 | | 9/2019 | He | |
| 11,874,642 | B2 | | 1/2024 | Klesk et al. | |
| 12,214,679 | B1 | * | 2/2025 | Gruenhagen | ............. H02J 7/02 |
| 2024/0326598 | A1 | * | 10/2024 | Matsumoto | ............. H02J 1/086 |

FOREIGN PATENT DOCUMENTS

| | | |
|---|---|---|
| CN | 105718208 A | 6/2016 |
| CN | 116776397 A | 9/2023 |
| JP | 2014137734 A | 7/2014 |
| KR | 20140079285 A | 6/2014 |
| WO | 2016070382 A1 | 5/2016 |

OTHER PUBLICATIONS

Google Scholar/Patents search—text refined (Year: 2025).*
Google Scholar/Patents search—text refined (Year: 2026).*

* cited by examiner

*Primary Examiner* — Christopher S McCarthy
(74) *Attorney, Agent, or Firm* — Shumaker & Sieffert, P.A.

(57) ABSTRACT

This disclosure is directed to circuits and techniques for configuring a driver circuit for a power switch when entering a fail-safe state. The driver circuit includes a volatile memory connected to a plurality of independent power supplies, the volatile memory configured to store a fail-safe configuration for the driver circuit. The driver circuit includes driver logic connected to the volatile memory that is configured to determine to enter a fail-safe state and, in response to determining to enter the fail-safe state, configure the driver circuit or a power switch according to the fail-safe configuration stored in the volatile memory.

18 Claims, 3 Drawing Sheets

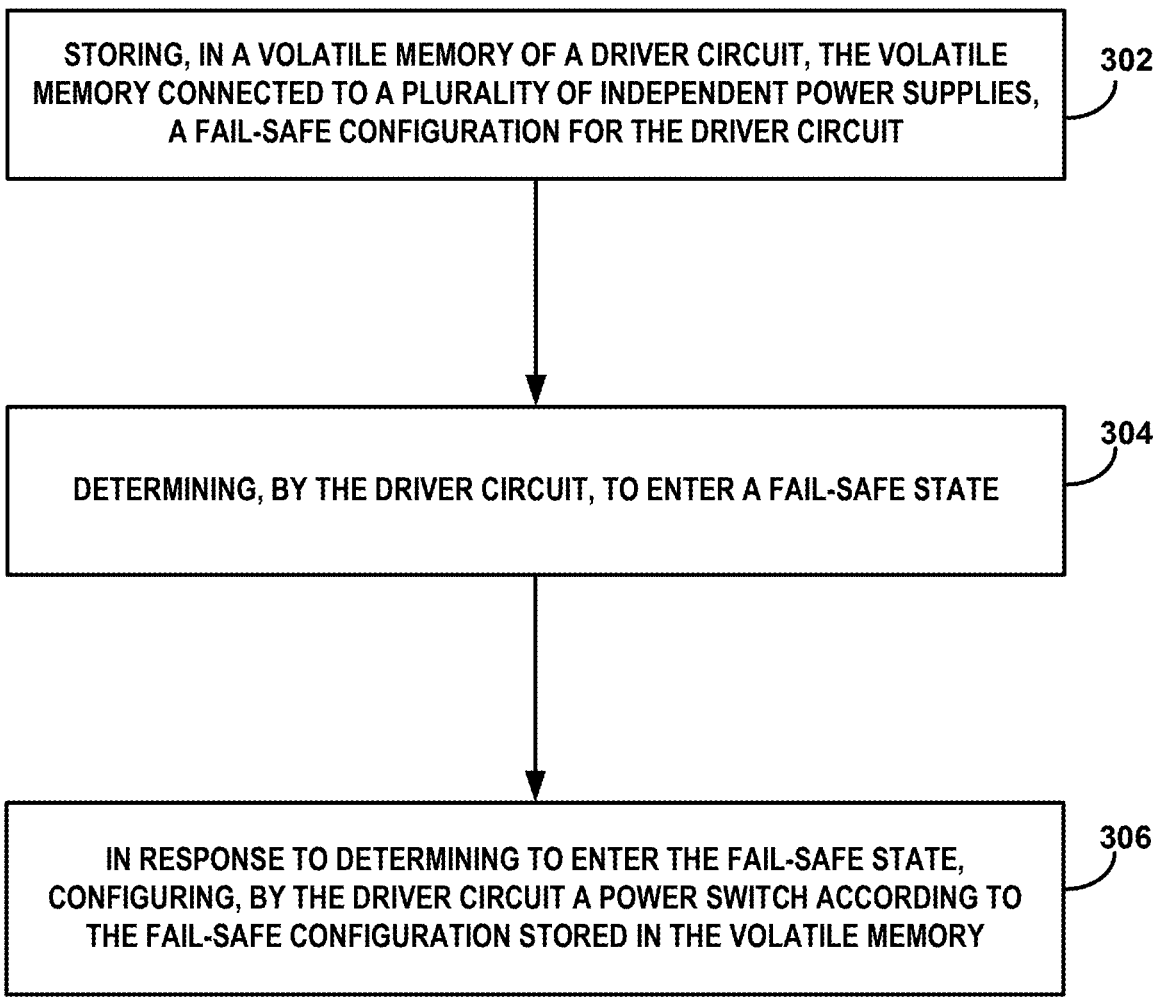

STORING, IN A VOLATILE MEMORY OF A DRIVER CIRCUIT, THE VOLATILE MEMORY CONNECTED TO A PLURALITY OF INDEPENDENT POWER SUPPLIES, A FAIL-SAFE CONFIGURATION FOR THE DRIVER CIRCUIT — 302

DETERMINING, BY THE DRIVER CIRCUIT, TO ENTER A FAIL-SAFE STATE — 304

IN RESPONSE TO DETERMINING TO ENTER THE FAIL-SAFE STATE, CONFIGURING, BY THE DRIVER CIRCUIT A POWER SWITCH ACCORDING TO THE FAIL-SAFE CONFIGURATION STORED IN THE VOLATILE MEMORY — 306

FIG. 3

VOLATILE MEMORY SCHEMA FOR SAFE STATE CONFIGURATION

TECHNICAL FIELD

This disclosure relates to driver circuits for power switches, and more specifically, techniques and circuits for storing configurations of driver circuits using volatile memory.

BACKGROUND

Power switches are used in a wide variety of applications in order to control power being delivered to a load. Power switches are typically controlled by a driver circuit via a modulation control signal, such as pulse width modulation (PWM), pulse frequency modulation (PFM), pulse duration modulation, pulse density modulation, or another type of modulation control signal. Modulation control signals can be applied to the gate of a power switch so as to control on/off switching of the power switch, and thereby control the average amount of power delivered through the power switch to a load. The on/off switching of the power switch effectively chops its power delivery up into discrete parts. The average value of voltage and/or current fed to a load can be controlled by turning the switch on and off at a fast rate. The longer the switch is on compared to the off periods, the higher the total power supplied to the load. In many applications, two different power switches are configured in a high-side and low-side configuration, and the on/off switching of the two power switches is synchronized in order to deliver the desired power to a switch node positioned between the high-side and low-side switch. In some examples, the power switch can be a smart power switch that performs self-diagnosis or may configure other diagnosis functions, and the power switch can protect itself against overcurrent and overtemperature conditions.

SUMMARY

In general, this disclosure describes circuits and techniques for using volatile memory to store fail-safe configuration for a driver circuit that drives a power switch. The circuits and techniques may enable writing the fail-safe configuration to volatile memory of the driver circuit at start-up and enable configuring the driver circuit according to the fail-safe configuration stored in the volatile memory when the driver circuit enters a fail-safe state. The driver circuit may be separate from the power switch or may be integrated with the power switch.

A driver circuit that drives a power switch may follow a safety element out of context (SEooC) approach to ensure that the driver circuit operates safety and reliably, even in the event of faults or unexpected conditions. To that end, when the driver circuit detects or receives an indication that the driver circuit or an external component is malfunctioning, the driver circuit may enter a fail-safe state to protect the driver circuit and other components, such as power switches and actuators, controlled by the driver circuit. To that end, the driver circuit may include a volatile memory that stores a fail-safe configuration. When the driver circuit enters the fail-safe state, the driver circuit may configure itself and/or external components (e.g., power switches) according to the fail-safe configuration.

Using volatile memory to store configuration information may potentially provide certain advantages to a driver circuit compared to using non-volatile memory. By using volatile memory to store configuration information, configuration information does not have to be written into memory at manufacturing time of the driver circuit. Instead, the driver circuit may be able to load configuration information in the field, such as from a host controller at startup time of the driver circuit. Enabling the driver circuit to load configuration information in the field may increase flexibility of the driver circuit and may enable more up-to-date configuration information to be loaded in the driver circuit. Further, by using volatile memory to store configuration information, a host controller may be able to easily update the configuration information for the driver circuit in order to improve the performance of the configuration information and to decrease bugs in the configuration information. Further, using volatile memory to store configuration information may potentially provide additional advantages to a driver circuit compared to using non-volatile memory, such as faster read and write speeds, lower latency, lower active power consumption, lower complexity, smaller area, and lower cost.

In accordance with circuits and techniques of this disclosure, a driver circuit that drives a power switch includes volatile memory that stores a fail-safe configuration for the driver circuit. Because volatile memory typically requires a continuous supply of power to maintain stored information, the volatile memory of the driver circuit is connected to a plurality of independent power supplies. Thus, if one of the components supplying power to the volatile memory fails, the other independent power supplies may provide redundant power to enable the volatile memory to maintain stored information.

The driver circuit may determine to enter a fail-safe state. For example, the driver circuit may detect a problem that causes the driver circuit to enter the fail-safe state, or the driver circuit may receive an indication that a host controller that controls the driver circuit has failed. The driver circuit may, in response to determining to enter the fail-safe state, configure the driver circuit or a power switch according to the fail-safe configuration stored in the volatile memory. For example, the driver circuit may turn the power switch on or off according to the fail-safe configuration and/or may configure the driver circuit according to the fail-safe configuration.

In some aspects, the techniques described herein relate to a driver circuit including: a volatile memory connected to a plurality of independent power supplies, the volatile memory configured to store a fail-safe configuration for the driver circuit; and driver logic connected to the volatile memory, the driver logic configured to: determine to enter a fail-safe state; and in response to determining to enter the fail-safe state, configure the driver circuit or a power switch according to the fail-safe configuration stored in the volatile memory.

In some aspects, the techniques described herein relate to a method including: storing, in a volatile memory of a driver circuit, the volatile memory connected to a plurality of independent power supplies, a fail-safe configuration for the driver circuit; determining, by the driver circuit, to enter a fail-safe state; and in response to determining to enter the fail-safe state, configuring, by the driver circuit, the driver circuit or a power switch according to the fail-safe configuration stored in the volatile memory.

In some aspects, the techniques described herein relate to a system, including: an actuator; a power switch configured to control power supplied to the actuator; a driver circuit configured to control the power switch; a host controller configured to control the driver circuit; and a supervision device configured to: detect a failure in the host controller; and in response to detecting the failure in the host controller, send, to the driver circuit, a request to enter a fail-safe state; wherein the driver circuit includes: a volatile memory connected to a plurality of independent power supplies, the volatile memory configured to store a fail-safe configuration for the driver circuit; and driver logic connected to the volatile memory, the driver logic configured to: receive the request to enter a fail-safe state; and in response to receiving the request to enter the fail-safe state, configure the driver circuit or the power switch according to the fail-safe configuration stored in the volatile memory.

Details of these and other examples are set forth in the accompanying drawings and the description below. Other features, objects, and advantages will be apparent from the description and drawings, and from the claims.

BRIEF DESCRIPTION OF DRAWINGS

FIG. 3 is a flow diagram illustrating a method of configuring a driver circuit according to this disclosure.

DETAILED DESCRIPTION

This disclosure describes circuits and techniques for using volatile memory to store fail-safe configuration for a driver circuit that drives a power switch. The circuits and techniques enable writing the fail-safe configuration to volatile memory of the driver circuit at start-up and enables configuring the driver circuit according to the fail-safe In accordance with circuits and techniques of this disclosure, a driver circuit that drives a power switch includes volatile memory that stores a fail-safe configuration for the driver circuit. Because volatile memory may require a continuous supply of power to maintain stored information, the volatile memory of the driver circuit is connected to a plurality of independent power supplies. Thus, if one of the components supplying power to the volatile memory fails, the other independent power supplies may provide redundant power to enable the volatile memory to maintain stored information.

The driver circuit may enter a fail-safe state if the driver circuit detects a problem that causes the driver circuit to enter the fail-safe state, or if the driver circuit receives an indication that a host controller that controls the driver circuit has failed. The driver circuit may, in response to determining to enter the fail-safe state, configure the driver circuit or a power switch according to the fail-safe configuration stored in the volatile memory. For example, the driver circuit may turn the power switch on or off according to the fail-safe configuration and/or may configure the driver circuit according to the fail-safe configuration to ensure safe operations of the driver circuit and components (e.g., power switches and actuators) controlled by the driver circuit.

Figure 1:
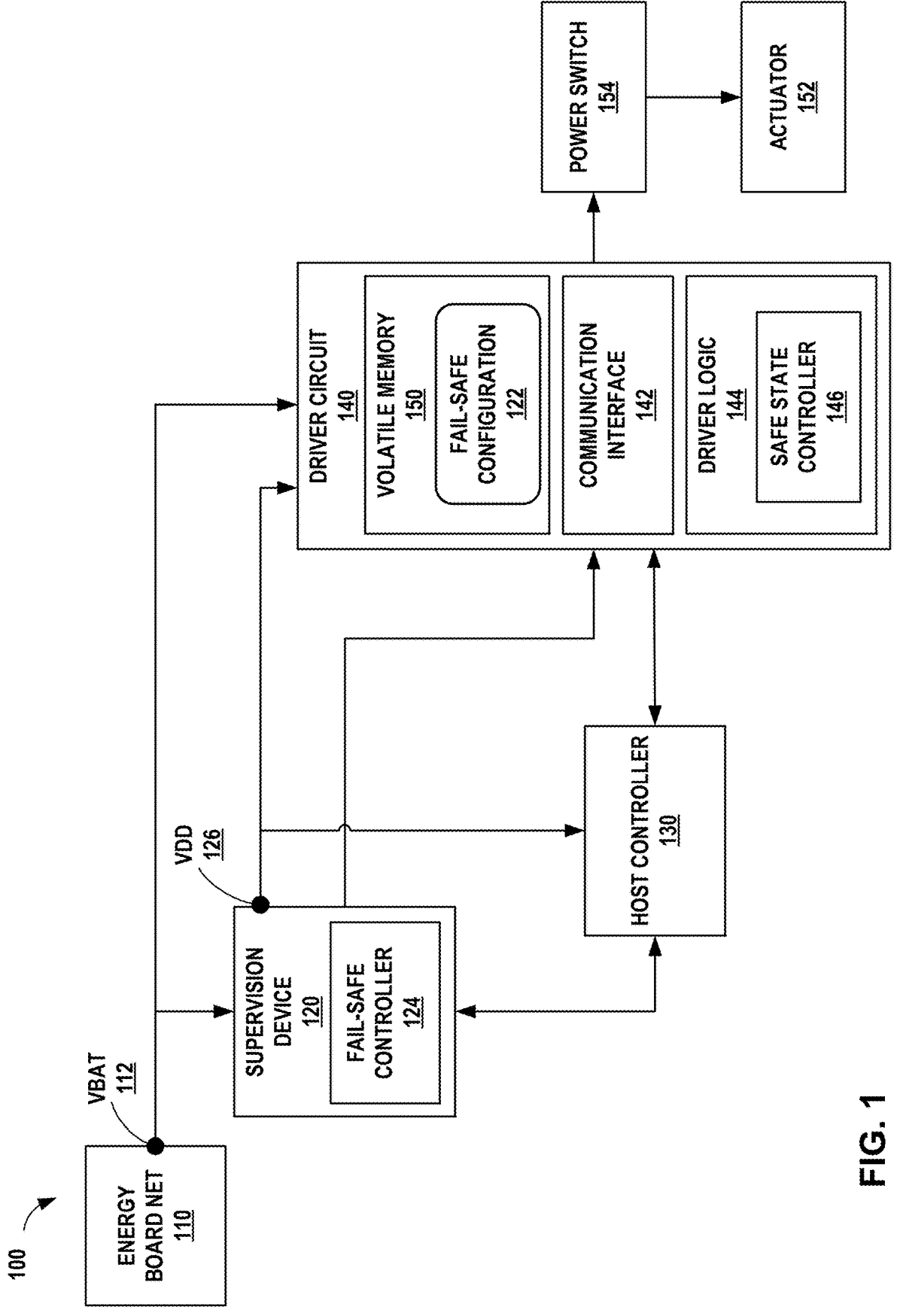
FIG. 1 is a block diagram of an example system that includes a power switch circuit, a driver circuit, and a controller.

FIG. 1 is a block diagram of an example system 100 that includes energy board net 110, supervision device 120, host controller 130, driver circuit 140, power switch 154, and actuator 152. System 100 may be part of a vehicle, such as an automobile (e.g., a car, a truck, a motorcycle, etc.).

Driver circuit 140 is communicably coupled to and configured to control power switch 154. Driver circuit 140 may comprise any type of driver for any type of power switch, such as a high-side switch driver, a low-side switch driver, a driver within a flyback power converter, or any driver used in any circuit arrangement that controls ON/OFF switching of one or more power switches. Driver circuit 140 may control power switch 154 via modulation signals, which may control the ON/OFF switching of a transistor within power switch 154. The modulation signals, for example, may comprise pulse width modulation (PWM) signals, pulse frequency modulation (PFM) signals, pulse duration modulation signals, pulse density modulation signal, or another type of modulation control signal use to control a power transistor. In normal operation, the signals from driver circuit 140 can be applied to the gate (or other control terminal) of a power switch within power switch 154 so as to control on/off switching of the power switch, and thereby control the average amount of power delivered through the power switch to a load, such as actuator 152.

Power switch 154 may be any type of power switch, such as a high-side switch, a low-side switch, and the like that delivers power to actuator 152. Power switch 154 comprise a power transistor. For example, the power transistor within power switch 154 may comprise an insulated gate bipolar transistor (IGBT), or a MOSFET. The MOSFET may be formed in silicon, in which case the MOSFET may be called a silicon MOSFET. Alternatively, the MOSFET may be formed in another semiconductor material, such as silicon carbide (SiC) or gallium nitride (GaN), in which case the MOSFET may be called a SiC MOSFET or a GaN MOSFET. While FIG. 1 illustrates driver circuit 140 and power switch 154 as separate components, power switch 154 may, in some aspects, be integrated into driver circuit 140.

Power switch 154 may deliver power to actuator 152. Actuator 152 may be a device that concerts electrical signals into physical action. For example, actuator 152 may control the opening and closing of valves, adjust mirrors, move windows, the locking and unlocking of doors, turning lights on and off, or perform other mechanical actions based on electronic signals. In some examples, power switch 154 may be a smart power switch that is integrated into driver circuit 140.

Host controller 130 may comprise a microprocessor configured to control driver circuit 140. Host controller 130 is communicably coupled to driver circuit 140 and may control driver circuit 140 by sending command signals to driver circuit 140. In some examples, based on these command signals, driver circuit 140 may send ON/OFF signals (e.g., gate control signals) to power switch 154 to turn the power switch ON or OFF.

Energy board net 110 may be a power source for components of system 100. In the context of a vehicle, energy board net 110 may be the onboard electrical power distribution system responsible for distributing electrical power throughout the vehicle. For example, energy board net 110 may include the battery, alternator, fuses, relays, wiring, and the like that connects electrical and electronic devices of the vehicle. In the example of FIG. 1, energy board net 110 may be a power source for supervision device 120 by supplying voltage, referred to herein as "$V_{BAT}$" voltage 112, to supervision device 120 and driver circuit 140.

Supervision device 120 may supervise the operation of components of system 100, such as host controller 130 and driver circuit 140. In some examples, supervision device 120 may be part of or may include a system basis chip, which is a type of circuitry (e.g., integrated circuit, system on a chip, semiconductor, etc.) used in automotive electronics to provide functionalities such as power management, interfacing, and communication tasks for automotive systems. A system basis chip may typically integrate several features, such as voltage regulation, communication interfaces (e.g., CAN bus, LIN bus), watchdog timers, and control outputs. Supervision device 120 may be a power source for host controller 130 and driver circuit 140 by supplying voltage, referred to herein as "$V_{DD}$" voltage 126, to both host controller 130 and to driver circuit 140.

Supervision device 120 is communicably coupled to host controller 130 and driver circuit 140. Supervision device 120 includes fail-safe controller 124 configured to monitor operations of components of system 100, such as host controller 130 and driver circuit 140 and to determine, based on the monitored operations of the components of system 100, whether driver circuit 140 should enter a fail-safe state. Fail-safe controller 124 may be configured to, in response to determining that driver circuit 140 should enter a fail-safe state, send, to driver circuit 140, a request to enter the fail-safe state. Such a request to enter the fail-safe state is also referred to herein as a limp home request, which is indicative of failure or malfunction of host controller 130 that controls driver circuit 140.

In some examples, fail-safe controller 124 may be configured to monitor "$V_{DD}$" voltage 126 being supplied to driver circuit 140. Supervision device 120 may, based on the behavior of "$V_{DD}$" voltage 126, send, to driver circuit 140, a request to enter the fail-safe state. For example, supervision device 120 may, in response to fail-safe controller 124 determining that the "$V_{DD}$" voltage 126 being supplied to driver circuit 140 is above an overvoltage threshold or is below an undervoltage threshold, send, to driver circuit 140, a request to enter the fail-safe state, such as in the form of a limp home request.

In some examples, fail-safe controller 124 may be configured to monitor operations of host controller 130 to determine the behavior of host controller 130 (e.g., whether host controller 130 is operating properly or is malfunctioning). Fail-safe controller 124 may be configured to monitor the operations of host controller 130 to determine whether host controller 130 is operating properly using any suitable technique. In some examples, fail-safe controller 124 may communicate with host controller 130 to use watchdog timers, heartbeat signals, test commands, self-test routings, or any other suitable techniques to determine whether host controller 130 is failing or otherwise malfunctioning. Supervision device 120 may, in response to fail-safe controller 124 determining that host controller 130 is failing or otherwise malfunctioning, send, to driver circuit 140, a request to enter the fail-safe state.

Driver circuit 140 includes communication interface 142, driver logic 144, and volatile memory 150. Communication interface 142 may be any suitable communication interface that enables driver circuit 140 to communicate with other components of system 100, such as supervision device 120, host controller 130, and power switch 154. For example, communication interface 142 may include one or more digital interfaces, such as a multi-channel serial interface, busses, and the like to send and receive signals and data to and from other components of system 100.

Driver logic 144 may be digital logic that can be configured, such as by configuration information stored in volatile memory 150 to control the operations of power switch 154. For example, driver logic 144 may be implemented as one or more microcontrollers, an application-specific integrated circuit (ASIC), or any other suitable form of configurable digital logic.

Driver logic 144 is configured to implement safe state controller 146, which may be configured to determine whether to cause driver circuit 140 to enter a fail-safe state and/or to perform operations to transition driver circuit 140 to the fail-safe state. A fail-safe state for driver circuit 140 may be a protective operational mode having a predefined operational condition designed to ensure safety and prevent damage to driver circuit 140 and other components of system 100. When driver circuit 140 is in the fail-safe state, driver circuit 140 may be in a safe operational mode that minimizes risk to components of system 100 and to the user of system 100. When driver circuit 140 is in the fail-safe state, driver circuit 140 may be configured to prevent unintended current flow to a load (e.g., actuator 152) and/or to ensure that critical loads remain powered to maintain essential functions.

In some examples, safe state controller 146 is configured to detect problems in the operation of driver circuit 140 and may, in response, cause driver logic 144 to enter a fail-safe state. For example, safe state controller 146 is configured to detect an overcurrent condition, an undercurrent condition, an overvoltage condition, an undervoltage condition, an overtemperature condition, an open load condition, or another problem in the operation of driver circuit 140. In some examples, power switch 154 may detect such conditions and may send an indication of the detected condition via a digital interface to safe state controller 146. Safe state controller 146 may be configured to, in response to detecting a problem in the operation of driver circuit 140 that may require driver circuit 140 to enter a fail-safe state, cause driver circuit 140 to enter the fail-safe state.

In some examples, driver circuit 140 may receive, via communication interface 142 and from supervision device 120, a request to enter the fail-safe state. Safe state controller 146 may, in response to driver circuit 140 receiving the request to enter the fail-safe state, determine to cause driver circuit 140 to enter the fail-safe state.

According to this disclosure, driver circuit 140 includes volatile memory 150 that is configured to store fail-safe configuration 122 for driver circuit 140. Fail-safe configuration 122 is information for configuring driver circuit 140 and/or power switch 154 to a particular fail-safe configuration when driver circuit 140 is in a fail-safe state.

Volatile memory 150 may be any memory, such as random-access memory (RAM), dynamic random-access memory (DRAM), static random-access memory (SRAM), and the like, that requires a continuous supply of power to maintain stored information. Because volatile memory 150 may require a continuous supply of power to maintain stored information, volatile memory 150 is connected to a plurality of independent power supplies. That is, two or more independent components of system 100 may each be a voltage source for volatile memory 150. In the example of FIG. 1, volatile memory 150 is connected to "$V_{BAT}$" voltage 112 supplied by energy board net 110 and "$V_{DD}$" voltage 126 supplied by supervision device 120. Connecting volatile memory 150 to a plurality of independent voltage supplies increases the reliability of volatile memory 150 by ensuring that power is supplied to volatile memory 150 even if one of the plurality of power supplies connected to volatile memory 150 stops supplying power to volatile memory 150.

To enter the fail-safe state, safe state controller 146 is configured to block digital write communication from host controller 130 to communication interface 142. Blocking digital write communication from host controller 130 to communication interface 142 may protect driver circuit 140 from receiving erroneous commands from host controller 130.

To enter the fail-safe state, safe state controller 146 may also configure power switch 154 according to fail-safe configuration 122 stored in volatile memory 150. For example, fail-state configuration 122 may specify configuration information about power switch 154, such as whether to turn power switch 154 on or off (e.g., connect or disconnect actuator 152 from power switch 154). For example, if actuator 152 is an actuator for lights of a vehicle, fail-safe configuration 122 may configure power switch 154 to turn on the lights of the vehicle. In another example, if actuator 152 is an actuator for a door lock of a vehicle, fail-safe configuration 122 may configure power switch 154 to unlock the door of the vehicle.

In some examples, as part of causing driver circuit 140 to enter the fail-safe state, safe state controller 146 may also configure driver circuit 140 according to fail-safe configuration 122. Fail-state configuration 122 may include configuration information regarding various behaviors, speeds, and/or timings of driver circuit 140 that safe state controller 146 may apply to driver circuit 140. In some examples, fail-state configuration 122 may include configuration information about driver circuit 140, such as any combination of turn-on and turn-off slew rates, soft start/stop, control logic, rise time, fall time, propagation delay, dead time, delay timers, and the like of driver circuit 140. Fail-state configuration 122 may also include configuration information regarding various thresholds of driver circuit 140 that safe state controller 146 may apply to driver circuit 140, such as an overvoltage detection threshold, an undervoltage detection threshold, an overcurrent detection threshold, an undercurrent detection threshold, a temperature threshold, and the like.

In some examples, driver circuit 140 that is powered on may enter a power-saving state, which is also referred to in this disclosure as a sleep state. While driver circuit 140 is in a power-saving state, volatile memory 150 is configured to receive a trickle supply of power from one or more of the plurality of independent power supplies connected to volatile memory 150. That is, while one or more of the plurality of independent power supplies connected to volatile memory 150 may stop providing power when driver circuit 140 is in a power-saving state, another one or more of the plurality of independent power supplies connected to volatile memory 150 may reduce the amount of power supplied to volatile memory 150 to a trickle supply of power. The trickle supply of power may provide sufficient power to volatile memory 150 to maintain stored information, such as fail-safe configuration 122, in volatile memory 150.

Driver circuit 140 may also exit from a power-saving state, such as by transitioning from the power-saving state to an active state, also referred to as an active mode or a full power mode. This may sometimes be referred to as waking driver circuit 140. For example, driver circuit 140 may be configured to exit from a power-saving state in response to receiving, while driver circuit 140 is in the power-saving state, a wake-up request. Driver circuit 140 may receive the wake-up request from supervision device 120 and/or host controller 130. Driver logic 144 of driver circuit 140 may be configured to receive the wake-up request while driver circuit 140 is in the power-saving state and, in response, configure driver circuit 140 according to a default start-up configuration for driver circuit 140 stored in volatile memory 150.

Similar to fail-safe configuration 122, the default start-up configuration may include configuration information for configuring power switch 154 and/or for configuring driver circuit 140. For example, the default start-up configuration may specify that power switch 154 be turned on or be turn off. The default start-up configuration may also include configuration information regarding various behaviors, speeds, and/or timings of driver circuit 140 that driver logic 144 may apply to driver circuit 140. In some examples, the default start-up configuration may include configuration information regarding any combination of turn-on and turn-off slew rates, soft start/stop, control logic, rise time, fall time, propagation delay, dead time, delay timers, and the like of driver circuit 140. The default start-up configuration may also include configuration information regarding various thresholds of driver circuit 140 that driver logic 144 may apply to driver circuit 140, such as an overcurrent detection threshold, an undercurrent detection threshold, an overvoltage detection threshold, an undervoltage detection threshold, and the like.

At startup of driver circuit 140, such as when driver circuit 140 is powered on, communication interface 142 is configured to receive, from host controller 130 via a digital interface, a digital write communication that specifies fail-safe configuration 122. Driver logic 144 may be configured to receive fail-safe configuration 122 from communication interface 142 via one or more internal busses and to write the received fail-safe configuration 122 into volatile memory 150. Driver logic 144 is configured to, responsive to writing fail-safe configuration 122 into volatile memory 150, lock volatile memory 150. Locking volatile memory 150 may prevent any further changes, such as write command or other operations, to volatile memory 150 until volatile memory 150 is unlocked.

Figure 2:
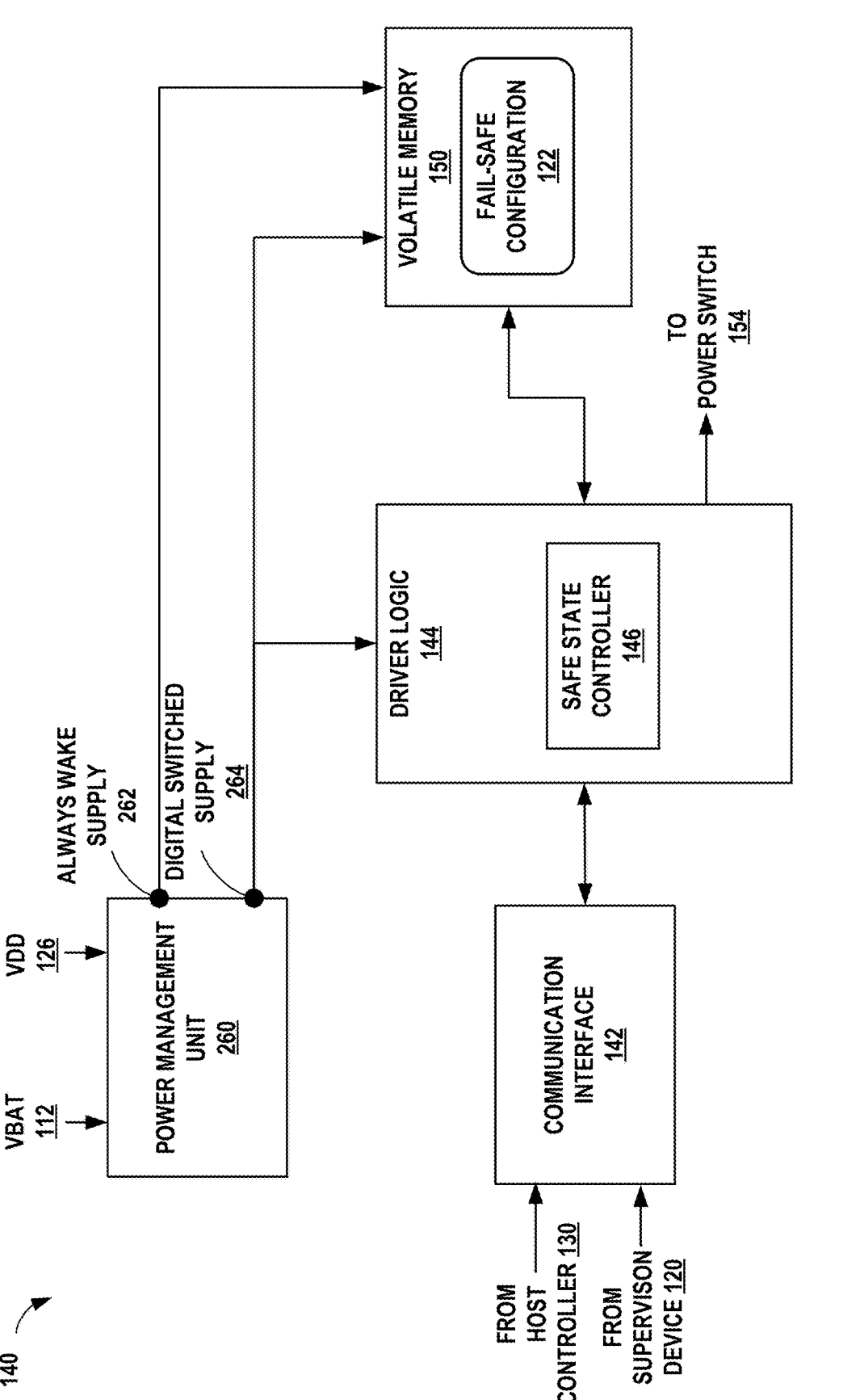
FIG. 2 is a block diagram illustrating the example driver circuit of FIG. 1 in further detail.

FIG. 2 is a block diagram illustrating the example driver circuit 140 of FIG. 1 in further detail. As shown in FIG. 2, driver circuit 140 includes power management unit 260, communication interface 142, driver logic 144, and volatile memory 150.

Power management unit 260 includes circuitry configured to manage delivery of power to other components, such as driver logic 144 and volatile memory 150 of driver circuit 140. For example, power management unit 260 may be configured to regulate and control the voltage applied to power switch 154. Power management unit 260 may also be configured to protect driver circuit 140, such as by providing overcurrent protection and overvoltage protection for driver circuit 140. Power management unit 260 may further be configured to implement power-saving modes for driver circuit 140, such as a sleep mode for driver circuit 140.

In the example of FIG. 2, power management unit 260 is configured to connect to a plurality of independent power supplies, in the form of energy board net 110 and supervision device 120, to receive "$V_{BAT}$" voltage 112 from energy board net 110 and to receive "$V_{DD}$" voltage 126 from supervision device 120. Power management unit 260 is configured to supply power that is received from energy board net 110 and supervision device 120 to driver logic 144 and volatile memory 150.

Power management unit 260 may be configured to supply power in the form of always wake supply voltage 262 and digital switched supply voltage 264. Power management unit 260 may be configured to supply digital switched supply voltage 264 during normal operations of driver circuit 140, such as when driver circuit 140 is in a full-power state. When driver circuit 140 is in a power-saving state, such as a sleep state, power management unit 260 may be configured to stop supplying digital switched supply voltage 264. Similarly, power management unit 260 may be configured to provide always wake supply voltage 262 as long as power management unit 260 receives at least one of "$V_{BAT}$" voltage 112 from energy board net 110 or "$V_{DD}$" voltage 126 from supervision device 120.

Power management unit 260 is configured to supply both always wake supply voltage 262 and digital switched supply voltage 264 to volatile memory 150 and to supply digital switched supply voltage 264 to driver logic 144. In normal operations of driver circuit 140, power management unit 260 may be configured to supply digital switched supply voltage 264 and always wake supply voltage 262 to driver logic 144 and volatile memory 150. Power management unit 260 may be configured to supply digital switched supply voltage 264 to volatile memory 150 for level-shifting the voltage level of volatile memory 150 and may be configured to supply always wake supply voltage 262 to volatile memory 150 for volatile memory 150 to maintain stored information.

When driver circuit 140 is in a sleep state, power management unit 260 may stop supplying digital switched supply voltage 264, which means power management unit 260 may stop supplying power to driver logic 144 while driver circuit 140 is in a sleep state. However, when driver circuit 140 is in a sleep state, power management unit 260 may continue to supply a trickle supply of voltage in the form of always wake supply voltage 262 to volatile memory 150 to enable volatile memory 150 to maintain stored information, such as fail-safe configuration 122, in volatile memory 150.

Communication interface 142 provides a digital interface for communicating with host controller 130. Communication interface 142 may be configured to receive commands or other data from host controller 130 from the digital interface and to send data, such as responses to the received commands, to host controller 130. Communication interface 142 may communicate with driver logic 144 via one or more chip internal buses, such as by sending commands received from host controller 130 to driver logic 144 via a chip internal output bus and by receiving data from driver logic 144 via a chip internal input bus.

Driver logic 144 is configured to control operations of power switch 154, such as by sending signals to power switch 154 to turn power switch 154 on and off and to connect and disconnect actuator 152 from the power supply. Driver logic 144 is also configured to implement safe state controller 146, which may be configured to determine whether to cause driver circuit 140 to enter a fail-safe state and/or perform operations to transition driver circuit 140 to the fail-safe state.

In some examples, safe state controller 146 is configured to cause driver circuit 140 to enter the fail-safe state in response to detecting a problem in the operation of driver circuit 140. For example, safe state controller 146 may be configured to detect that driver circuit 140 is in an overvoltage state, an undervoltage state, an overcurrent state, an undercurrent state, an overtemperature condition, an open load condition, or another problem in the operation of driver circuit 140. Safe state controller 146 may be configured to, in response to detecting a problem in the operation of driver circuit 140, cause driver circuit 140 to enter a fail-safe state.

In some examples, communication interface 142 may include a digital interface for communicating with supervision device 120 to receive limp home requests from supervision device 120. Communication interface 142 may pass any received limp home requests to safe state controller 146. Safe state controller 146 may be configured to, in response to receiving a limp home request from supervision device 120, cause driver circuit 140 to enter a fail-safe state.

Driver logic 144 connects to volatile memory 150 via one or more internal busses to write and read data, such as fail-safe configuration 122, to and from volatile memory 150. To enter the fail-safe state, safe state controller 146 is configured to block digital write communication from host controller 130 to communication interface 142, which may protect driver circuit 140 from receiving erroneous commands from host controller 130.

To enter the fail-safe state, safe state controller 146 is also configured to read fail-safe configuration 122 from volatile memory 150 and to configure driver circuit 140 and/or power switch 154 according to fail-safe configuration 122. For example, fail-safe configuration 122 may specify configuration information regarding power switch 154, such as whether to turn power switch 154 on or off and/or whether to connect or disconnect actuator 152 from the power supply. Fail-safe configuration 122 may also specify configuration information regarding various behaviors, speeds, and/or timings of driver circuit 140 that safe state controller 146 may apply to driver circuit 140. Safe state controller 146 may therefore be configured to configure driver circuit 140 and/or power switch 154 according to fail-safe configuration 122.

Because volatile memory 150 may require a continuous supply of power to maintain stored information, volatile memory 150 does not maintain stored information when driver circuit 140 is off. Thus, during startup of driver circuit 140, driver circuit 140 may be configured to receive fail-state configuration 122 and to write fail-state configuration 122 into volatile memory 150.

At startup of driver circuit 140, such as when driver circuit 140 is powered on, communication interface 142 is configured to receive, from host controller 130 via a digital interface, a digital write communication that specifies fail-safe configuration 122. Driver logic 144 may be configured to receive fail-safe configuration 122 from communication interface 142 via one or more internal busses and to write the received fail-safe configuration 122 into volatile memory 150. Driver logic 144 is configured to, responsive to writing fail-safe configuration 122 into volatile memory 150, lock volatile memory 150. Locking volatile memory 150 may prevent any further changes, such as write commands or other operations, to volatile memory 150 until volatile memory 150 is unlocked.

Driver logic 144 is configured to, prior to or after writing fail-safe configuration 122 into volatile memory 150, check the integrity of fail-safe configuration 122. For example, driver logic 144 may be configured to, prior to writing fail-safe configuration 122 into volatile memory 150, check the integrity of fail-safe configuration 122. If driver logic 144 determines that fail-safe configuration 122 fails the integrity check, driver logic 144 may be configured to refrain from writing fail-safe configuration 122 into volatile memory 150 and to send a request to 130 via communication interface 142 to re-send fail-safe configuration 122.

For example, driver logic 144 may be configured to generate a checksum for fail-safe configuration 122 via any suitable technique, such as Fletcher's checksum, Adler-32, and the like. Driver logic 144 may be configured to compare the generated checksum for fail-safe configuration 122 with a valid checksum for fail-safe configuration 122. For example, the digital write communication that specifies fail-safe configuration 122, as received by driver circuit 140, may include a valid checksum for fail-safe configuration 122. Driver logic 144 may be configured to compare the generated checksum for fail-safe configuration 122 with the valid checksum for fail-safe configuration 122 received as part of the digital write communication to check the integrity of fail-safe configuration 122. Driver logic 144 may be configured to, in response to determining that the integrity of fail-safe configuration 122 has not been compromised, write fail-safe configuration 122 to volatile memory 150.

In some examples, driver logic 144 may be configured to output the generated checksum for fail-safe configuration 122 to an external component, such as supervision device 120 or host controller 130. The external component may be configured to, in response receiving the generated checksum for fail-safe configuration 122, compare the generated checksum for fail-safe configuration 122 with a valid checksum for fail-safe configuration 122 to determine whether fail-safe configuration 122 has been correctly written into volatile memory. The external component may therefore be configured to send, to driver circuit 140, a signal that indicates whether the generated checksum of the fail-safe configuration 122 is valid. Driver logic 144 may, in response to driver circuit 140 receiving, from the external component, a signal that indicates the generated checksum of the fail-safe configuration 122 is valid, write fail-safe configuration 122 to volatile memory 150.

In another example, driver logic 144 may be configured to, after writing fail-safe configuration 122 into volatile memory 150, check the integrity of fail-safe configuration 122. If driver logic 144 determines that fail-safe configuration 122 fails the integrity check, driver logic 144 may be configured to delete fail-safe configuration 122 from volatile memory 150 and to send a request to 130 via communication interface 142 to re-send fail-safe configuration 122.

In some examples, driver logic 144 may be configured to compare the generated checksum for fail-safe configuration 122 with a valid checksum for fail-safe configuration 122. For example, the digital write communication that specifies fail-safe configuration 122, as received by driver circuit 140, may include a valid checksum for fail-safe configuration 122. Driver logic 144 may compare the generated checksum for fail-safe configuration 122 with the valid checksum for fail-safe configuration 122 received as part of the digital write communication to determine whether fail-safe configuration 122 has been correctly written into volatile memory.

In some examples, driver logic 144 may be configured to check whether fail-safe configuration 122 has been correctly written into volatile memory 150. Driver logic 144 may perform the check either prior to or after locking writes to volatile memory 150. For example, volatile memory 150 may be configured to, in response to fail-safe configuration 122 being written into memory, use any suitable technique, such as by performing a Cyclic Redundancy Check (CRC) on portions of volatile memory 150 to which fail-safe configuration 122 has been written, to generate a checksum for fail-safe configuration 122.

In some examples, driver logic 144 may be configured to output the generated checksum for fail-safe configuration 122 to an external component, such as supervision device 120 or host controller 130. The external component may be configured to, in response receiving the generated checksum for fail-safe configuration 122, compare the generated checksum for fail-safe configuration 122 with a valid checksum for fail-safe configuration 122 to determine whether fail-safe configuration 122 has been correctly written into volatile memory. The external component may therefore be configured to send, to driver circuit 140, a signal that indicates whether the generated checksum of the fail-safe configuration 122 is valid.

In some examples, driver circuit 140 may be configured to protect writes to volatile memory 150. That is, driver logic 144 may be configured to, in response to receiving a request to write data into volatile memory 150, determine whether the request specifies a valid password. Such a password may be stored in read-only memory (not shown) of driver circuit 140. Driver logic 144 may be configured to, in response to determining that the request specifies a valid password, unlock volatile memory 150 for writing data to volatile memory 150.

In some examples, a valid password may be in the form of a specified pattern of writes to specific registers and/or specific locations in volatile memory 150. Such a specified pattern of writes may be a pattern of writes of specific data to specific registers and/or to specific locations in volatile memory 150. Driver circuit 140 may be configured to receive, such as from supervision device 120 or host controller 130, a request to write data into volatile memory 150 that specifies a pattern of writes to specific registers and/or to specific locations in volatile memory 150. Driver logic 144 may be configured to, in response to receiving the request to write data into volatile memory 150, determine whether the pattern of writes specified by the request matches the specified pattern of writes, such as stored in a ROM of driver circuit 140. Driver logic 144 may be configured to, in response to determining that the pattern of writes specified by the request matches the specified pattern of writes that unlocks the volatile memory, unlock volatile memory 150 for writing data to volatile memory 150.

In some examples, driver circuit 140 may enter a power-saving state, which is also referred to in this disclosure as a sleep state. For example, driver logic 144 may be configured to determine whether driver circuit 140 has been idle for an amount of time that exceeds an idle threshold, such as one minute, five minutes, and the like. Driver logic 144 may, in response to determining that driver circuit 140 has been idle for an amount of time that exceeds the idle threshold, operate to transition driver circuit 140 to the power-saving state.

While driver circuit 140 is in a power-saving state, volatile memory 150 is configured to receive a trickle supply of power from one or more of the plurality of independent power supplies connected to volatile memory 150. For example, power management unit 260 may be configured to receive the trickle supply of power from one of "$V_{BAT}$" voltage 112 or "$V_{DD}$" voltage 126. The trickle supply of power may provide sufficient power to volatile memory 150 to maintain stored information, such as fail-safe configuration 122, in volatile memory 150.

Driver circuit 140 may also exit from a power-saving state, such as by transitioning from the power-saving state to an active state, also referred to as an active mode or a full power mode. This may sometimes be referred to as waking driver circuit 140. For example, driver circuit 140 may be configured to exit from a power-saving state in response to receiving, while driver circuit 140 is in the power-saving state, a wake up request. Driver circuit 140 may receive the wake up request from supervision device 120 and/or host controller 130. Driver logic 144 of driver circuit 140 may be configured to receive the wake up request while driver circuit 140 is in the power-saving state and, in response, configure driver circuit 140 according to a default start-up configuration for driver circuit 140 stored in volatile memory 150.

Similar to fail-safe configuration 122, the default start-up configuration may include configuration information for configuring power switch 154 and/or for configuring driver circuit 140. For example, the default start-up configuration may specify that power switch 154 be turned on or be turn off.

The default start-up configuration may also include configuration information regarding various behaviors, speeds, and/or timings of driver circuit 140 that driver logic 144 may apply to driver circuit 140. In some examples, the default start-up configuration may include configuration information regarding any combination of turn-on and turn-off slew rates, soft start/stop, control logic, rise time, fall time, propagation delay, dead time, delay timers, and the like of driver circuit 140. The default start-up configuration may also include configuration information regarding various thresholds of driver circuit 140 that driver logic 144 may apply to driver circuit 140, such as an overcurrent detection threshold, an undervoltage detection threshold, and the like.

FIG. 3 is a flow diagram illustrating a method of configuring a driver circuit according to this disclosure. FIG. 3 will be described from the perspective of driver circuit 140 shown in FIGS. 1 and 2, although the method could apply to wide variety other driver circuits.

As shown in FIG. 3, driver circuit 140 may store, in a volatile memory 150 of driver circuit 140, the volatile memory 150 connected to a plurality of independent power supplies 112 and 126, a fail-safe configuration 122 for the driver circuit 140 (302).

In some examples, driver circuit 140 may, in response to startup of the driver circuit 140, receive, from a host controller 130, a digital write communication that specifies the fail-safe configuration 122. Driver circuit 140 may write the fail-safe configuration 122 into the volatile memory 150 and may, responsive to writing the fail-safe configuration 122 into the volatile memory 150, lock the volatile memory 150.

In some examples, to receive the digital write communication that specifies the fail-safe configuration 122, driver circuit 140 may receive, from the host controller 130, a pattern of writes (e.g., write operations) to the volatile memory 150. Driver circuit 140 may determine that the pattern of writes matches a specified pattern of writes that unlocks the volatile memory 150. Driver circuit 140 may, in response to determining the pattern of writes matches the specified pattern of writes, unlock the volatile memory 150.

In some examples, to write the fail-safe configuration into the volatile memory 150, driver circuit 140 may, in response to receiving the digital write communication that specifies the fail-safe configuration 122, determine a checksum of the fail-safe configuration 122. Driver circuit 140 may output the checksum of the fail-safe configuration to a supervision device 120. Driver circuit 140 may, in response to outputting the checksum of the fail-safe configuration 122 to the supervision device 120, receive, from the supervision device 120, a signal that indicates the checksum of the fail-safe configuration 122 is valid. Driver circuit 140 may, in response to receiving the signal that indicates the checksum of the fail-safe configuration 122 is valid, write the fail-safe configuration 122 into the volatile memory 150.

Driver circuit 140 may determine to enter a fail-safe state (304). In some examples, to determine to enter the fail-safe state, driver circuit 140 may receive a request to enter a fail-safe state. Driver circuit 140 may, in response to receiving the request to enter the fail-safe state, enter the fail-safe state. In some examples, to receive the request to enter the fail-safe state, driver circuit 140 may receive a limp home request from a supervision device 120 indicative of failure of a host controller 130 that controls the driver circuit 140. In some examples, driver circuit 140 may, in response to receiving the request to enter the fail-safe state, block digital write communication to the volatile memory 150.

Driver circuit 140 may, in response to determining to enter the fail-safe state, configure the driver circuit 140 or a power switch 154 according to the fail-safe configuration 122 stored in the volatile memory 150 (306).

In some examples, the volatile memory 150 receives a trickle supply from one of the plurality of independent power supplies 112 and 126 while the driver circuit 140 is in a sleep state. In some examples, the volatile memory 150 stores a default start-up configuration for the driver circuit 140. While the driver circuit 140 is in the sleep state, driver circuit 140 may receive a wake up request. Driver circuit 140 may, in response to receiving the wake up request, configure the driver circuit 140 or the power switch 154 according to the default start-up configuration stored in the volatile memory 150. In some examples, the power switch 154 is configured to control power supplied to an actuator 152 in a vehicle.

The following clauses may illustrate one or more aspects of the disclosure.

Clause 1. A driver circuit comprising: a volatile memory connected to a plurality of independent power supplies, the volatile memory configured to store a fail-safe configuration for the driver circuit; and driver logic connected to the volatile memory, the driver logic configured to: determine to enter a fail-safe state; and in response to determining to enter the fail-safe state, configure the driver circuit or a power switch according to the fail-safe configuration stored in the volatile memory.

Clause 2. The driver circuit of clause 1, wherein the driver logic is further configured to: in response to startup of the driver circuit, receive, from a host controller, a digital write communication that specifies the fail-safe configuration; write the fail-safe configuration into the volatile memory; and responsive to writing the fail-safe configuration into the volatile memory, lock the volatile memory.

Clause 3. The driver circuit of clause 2, wherein to receive the digital write communication that specifies the fail-safe configuration, the driver logic is configured to: receive, from the host controller, a pattern of writes to the volatile memory; determine that the pattern of writes matches a specified pattern of writes that unlocks the volatile memory; and in response to determining the pattern of writes matches the specified pattern of writes, unlock the volatile memory.

Clause 4. The driver circuit of any of clauses 2 or 3, wherein to write the fail-safe configuration into the volatile memory, the driver logic is further configured to: in response to receiving the digital write communication that specifies the fail-safe configuration, determine a checksum of the fail-safe configuration; output the checksum of the fail-safe configuration to a supervision device; in response to outputting the checksum of the fail-safe configuration to the supervision device, receive, from the supervision device, a signal that indicates the checksum of the fail-safe configuration is valid; and in response to receiving the signal that indicates the checksum of the fail-safe configuration is valid, write the fail-safe configuration into the volatile memory.

Clause 5. The driver circuit of any of clauses 1-4, wherein to determine to enter the fail-safe state, the driver circuit is configured to: receive a request to enter the fail-safe state; and in response to receiving the request to enter the fail-safe state, enter the fail-safe state.

Clause 6. The driver circuit of clause 5, wherein to receive the request to enter the fail-safe state, the driver logic is configured to: receive a limp home request from a supervision device indicative of failure of a host controller that controls the driver circuit.

Clause 7. The driver circuit of any of clauses 5 and 6, wherein the driver logic is further configured to: in response to receiving the request to enter the fail-safe state, block digital write communication to the volatile memory.

Clause 8. The driver circuit of any of clauses 1-7, wherein the volatile memory is configured to receive a trickle supply from one of the plurality of independent power supplies while the driver circuit is in a sleep state.

Clause 9. The driver circuit of clause 8, wherein the volatile memory is configured to store a default start-up configuration for the driver circuit; and wherein the driver logic is further configured to: while the driver circuit is in the sleep state, receive a wake up request; and in response to receiving the wake up request, configure the driver circuit or the power switch according to the default start-up configuration stored in the volatile memory.

Clause 10. The driver circuit of any of clauses 1-9, wherein the power switch is configured to control power supplied to an actuator in a vehicle.

Clause 11. A method comprising: storing, in a volatile memory of a driver circuit, the volatile memory connected to a plurality of independent power supplies, a fail-safe configuration for the driver circuit; determining, by the driver circuit, to enter a fail-safe state; and in response to determining to enter the fail-safe state, configuring, by the driver circuit, the driver circuit or a power switch according to the fail-safe configuration stored in the volatile memory.

Clause 12. The method of clause 11, further comprising: in response to startup of the driver circuit, receiving, by the driver circuit and from a host controller, a digital write communication that specifies the fail-safe configuration; writing, by the driver circuit, the fail-safe configuration into the volatile memory; and responsive to writing the fail-safe configuration into the volatile memory, locking, by the driver circuit, the volatile memory.

Clause 13. The method of clause 12, wherein receiving the digital write communication that specifies the fail-safe configuration further comprises: receiving, by the driver circuit and from the host controller, a pattern of writes to the volatile memory; determining, by the driver circuit, that the pattern of writes matches a specified pattern of writes that unlocks the volatile memory; and in response to determining the pattern of writes matches the specified pattern of writes, unlocking, by the driver circuit, the volatile memory.

Clause 14. The method of any of clauses 12 or 13, wherein writing the fail-safe configuration into the volatile memory further comprises: in response to receiving the digital write communication that specifies the fail-safe configuration, determining, by the driver circuit, a checksum of the fail-safe configuration; outputting, by the driver circuit, the checksum of the fail-safe configuration to a supervision device; in response to outputting the checksum of the fail-safe configuration to the supervision device, receiving, by the driver circuit and from the supervision device, a signal that indicates the checksum of the fail-safe configuration is valid; and in response to receiving the signal that indicates the checksum of the fail-safe configuration is valid, writing, by the driver circuit, the fail-safe configuration into the volatile memory.

Clause 15. The method of any of clauses 11-14, wherein determining to enter the fail-safe state further comprises: receiving, by the driver circuit, a request to enter a fail-safe state; and in response to receiving the request to enter the fail-safe state, entering, by the driver circuit, the fail-safe state.

Clause 16. The method of clause 15, wherein receiving the request to enter the fail-safe state further comprises: receiving, by the driver circuit, a limp home request from a supervision device indicative of failure of a host controller that controls the driver circuit.

Clause 17. The method of any of clauses 15 or 16, further comprising: in response to receiving the request to enter the fail-safe state, blocking, by the driver circuit, digital write communication to the volatile memory.

Clause 18. The method of any of clauses 11-17, wherein the volatile memory receives a trickle supply from one of the plurality of independent power supplies while the driver circuit is in a sleep state.

Clause 19. The method of clause 18, wherein the volatile memory stores a default start-up configuration for the driver circuit, further comprising: while the driver circuit is in the sleep state, receiving, by the driver circuit, a wake up request; and in response to receiving the wake up request, configuring, by the driver circuit, the driver circuit or the power switch according to the default start-up configuration stored in the volatile memory.

Clause 20. The method of any of clauses 11-19, wherein the power switch is configured to control power supplied to an actuator in a vehicle.

Clause 21. A system, comprising: an actuator; a power switch configured to control power supplied to the actuator; a driver circuit configured to control the power switch; a host controller configured to control the driver circuit; and a supervision device configured to: detect a failure in the host controller; and in response to detecting the failure in the host controller, send, to the driver circuit, a request to enter a fail-safe state; wherein the driver circuit comprises: a volatile memory connected to a plurality of independent power supplies, the volatile memory configured to store a fail-safe configuration for the driver circuit; and driver logic connected to the volatile memory, the driver logic configured to: receive the request to enter a fail-safe state; and in response to receiving the request to enter the fail-safe state, configure the driver circuit or the power switch according to the fail-safe configuration stored in the volatile memory.

Various aspects have been described in this disclosure. These and other aspects are within the scope of the following claims.

The invention claimed is:

1. A driver circuit comprising:
a volatile memory connected to a plurality of independent power supplies, the volatile memory configured to store a fail-safe configuration for the driver circuit; and
driver logic connected to the volatile memory, the driver logic configured to:
in response to startup of the driver circuit, receive, from a host controller, a digital write communication that specifies the fail-safe configuration;
write the fail-safe configuration into the volatile memory;
responsive to writing the fail-safe configuration into the volatile memory, lock the volatile memory;
determine to enter a fail-safe state; and
in response to determining to enter the fail-safe state, configure the driver circuit or a power switch according to the fail-safe configuration stored in the volatile memory.

2. The driver circuit of claim 1, wherein to receive the digital write communication that specifies the fail-safe configuration, the driver logic is configured to:

receive, from the host controller, a pattern of writes to the volatile memory;

determine that the pattern of writes matches a specified pattern of writes that unlocks the volatile memory; and in response to determining the pattern of writes matches the specified pattern of writes, unlock the volatile memory.

3. The driver circuit of claim 1, wherein to write the fail-safe configuration into the volatile memory, the driver logic is further configured to:

in response to receiving the digital write communication that specifies the fail-safe configuration, determine a checksum of the fail-safe configuration;

output the checksum of the fail-safe configuration to a supervision device;

in response to outputting the checksum of the fail-safe configuration to the supervision device, receive, from the supervision device, a signal that indicates the checksum of the fail-safe configuration is valid; and in response to receiving the signal that indicates the checksum of the fail-safe configuration is valid, write the fail-safe configuration into the volatile memory.

4. The driver circuit of claim 1, wherein to determine to enter the fail-safe state, the driver circuit is configured to:

receive a request to enter the fail-safe state; and in response to receiving the request to enter the fail-safe state, enter the fail-safe state.

5. The driver circuit of claim 4, wherein to receive the request to enter the fail-safe state, the driver logic is configured to:

receive a limp home request from a supervision device indicative of failure of the host controller that controls the driver circuit.

6. The driver circuit of claim 4, wherein the driver logic is further configured to:

in response to receiving the request to enter the fail-safe state, block digital write communication to the volatile memory.

7. The driver circuit of claim 1, wherein the volatile memory is configured to receive a trickle supply from one of the plurality of independent power supplies while the driver circuit is in a sleep state.

8. The driver circuit of claim 7, wherein the volatile memory is configured to store a default start-up configuration for the driver circuit; and wherein the driver logic is further configured to:

while the driver circuit is in the sleep state, receive a wake up request; and in response to receiving the wake up request, configure the driver circuit or the power switch according to the default start-up configuration stored in the volatile memory.

9. The driver circuit of claim 1, wherein the power switch is configured to control power supplied to an actuator in a vehicle.

10. A method comprising:

in response to startup of a driver circuit, receiving, by the driver circuit and from a host controller, a digital write communication that specifies a fail-safe configuration;

writing, by the driver circuit, the fail-safe configuration into volatile memory of the driver circuit, the volatile memory connected to a plurality of independent power supplies; and responsive to writing the fail-safe configuration into the volatile memory, locking, by the driver circuit, the volatile memory;

storing, in the volatile memory of a driver circuit, the fail-safe configuration for the driver circuit;

determining, by the driver circuit, to enter a fail-safe state; and in response to determining to enter the fail-safe state, configuring, by the driver circuit, the driver circuit or a power switch according to the fail-safe configuration stored in the volatile memory.

11. The method of claim 10, wherein receiving the digital write communication that specifies the fail-safe configuration further comprises:

receiving, by the driver circuit and from the host controller, a pattern of writes to the volatile memory;

determining, by the driver circuit, that the pattern of writes matches a specified pattern of writes that unlocks the volatile memory; and in response to determining the pattern of writes matches the specified pattern of writes, unlocking, by the driver circuit, the volatile memory.

12. The method of claim 10, wherein writing the fail-safe configuration into the volatile memory further comprises:

in response to receiving the digital write communication that specifies the fail-safe configuration, determining, by the driver circuit, a checksum of the fail-safe configuration;

outputting, by the driver circuit, the checksum of the fail-safe configuration to a supervision device;

in response to outputting the checksum of the fail-safe configuration to the supervision device, receiving, by the driver circuit and from the supervision device, a signal that indicates the checksum of the fail-safe configuration is valid; and in response to receiving the signal that indicates the checksum of the fail-safe configuration is valid, writing, by the driver circuit, the fail-safe configuration into the volatile memory.

13. The method of claim 10, wherein determining to enter the fail-safe state further comprises:

receiving, by the driver circuit, a request to enter the fail-safe state; and in response to receiving the request to enter the fail-safe state, entering, by the driver circuit, the fail-safe state.

14. The method of claim 13, wherein receiving the request to enter the fail-safe state further comprises:

receiving, by the driver circuit, a limp home request from a supervision device indicative of failure of host controller that controls the driver circuit.

15. The method of any of claim 10, wherein the volatile memory receives a trickle supply from one of the plurality of independent power supplies while the driver circuit is in a sleep state.

16. The method of claim 15, wherein the volatile memory stores a default start-up configuration for the driver circuit, further comprising:

while the driver circuit is in the sleep state, receiving, by the driver circuit, a wake up request; and in response to receiving the wake up request, configuring, by the driver circuit, the driver circuit or the power switch according to the default start-up configuration stored in the volatile memory.

17. The method of any of claim 10, wherein the power switch is configured to control power supplied to an actuator in a vehicle.

18. A system, comprising:

an actuator;

a power switch configured to control power supplied to the actuator;

a driver circuit configured to control the power switch;

a host controller configured to control the driver circuit; and a supervision device configured to:

detect a failure in the host controller; and in response to detecting the failure in the host controller, send, to the driver circuit, a request to enter a fail-safe state;

wherein the driver circuit comprises:

a volatile memory connected to a plurality of independent power supplies, the volatile memory configured to store a fail-safe configuration for the driver circuit; and driver logic connected to the volatile memory, the driver logic configured to:

in response to startup of the driver circuit, receive, from the host controller, a digital write communication that specifies the fail-safe configuration;

write the fail-safe configuration into the volatile memory;

responsive to writing the fail-safe configuration into the volatile memory, lock the volatile memory;

receive the request to enter a fail-safe state; and in response to receiving the request to enter the fail-safe state, configure the driver circuit or the power switch according to the fail-safe configuration stored in the volatile memory.

\* \* \* \* \*